UNITED STATES PATENT OFFICE.

CHARLES F. LOTTMAN, OF HOUSTON, TEXAS.

PROCESS OF CURING MOSS.

SPECIFICATION forming part of Letters Patent No. 363,150, dated May 17, 1887.

Application filed August 27, 1886. Serial No. 212,038. (No specimens.)

*To all whom it may concern:*

Be it known that I, CHARLES F. LOTTMAN, of Houston, in the county of Harris and State of Texas, have invented a new and Improved Process of Curing Moss, of which the following is a full, clear, and exact description.

My invention relates to a new and improved process of curing Spanish moss, the object of the invention being to shorten the time heretofore deemed necessary to properly cure the moss; second, to obtain a larger percentage of the higher grades of fiber; third, to so treat the moss that the fiber will not be injured, but will appear in a sound healthy condition, and, fourth, to so treat the moss that any desired grade of fiber may be obtained.

Heretofore the moss to be cured was placed in large quantities, while green, in pits or upon the level ground, where it was left for from two to four months, according to the grade of fiber which it was desired to obtain. At the end of two months there would be a certain amount of bark upon the fiber; but this bark and the fiber were deadened and had a dark gray color, selling in the market for what is known as "XX" or "gray moss." The material taken after three months is more perfectly cured, and is of a darker color than the XX moss, and is termed "XXX" or "brown moss," while the product obtained after the material has stood for four months is termed "XXXX" or "black moss." By this old process a great deal of the material was wasted, as one thousand pounds of moss would produce only about two hundred pounds of the XXXX or black moss, two hundred and fifty pounds of the XXX or brown moss, and about three hundred or three hundred and fifty pounds of the XX or gray moss. Then, too, the product was very irregular and had to be carefully sorted, as much of it was always found to be overcured or rotten, while other parts were not clear of the bark.

The process forming the subject-matter of this application is quick and simple, and as the moss is uniformly cured is much less expensive, and is very much more satisfactory than the old method of curing, as pointed out above.

The process is as follows: Take five hundred pounds, or thereabout, of green moss and pack tightly into bales by means of a baling-press or otherwise, feeding the moss in in small quantities and keeping it thoroughly saturated while being packed. After the moss has been sufficiently compressed it is tied with baleties in the usual manner, and a number of the bales so formed are piled or packed closely together, so as to prevent all circulation of air between the bales. The bales so formed and piled together are kept well saturated with water for from eight to twenty-one days, the time varying with the grade of fiber which it is desired to produce, and in practice I find that eight days is sufficient to produce a uniform lot of fiber of the XX grade, that fourteen days are required to produce the XXX grade, and that twenty-one days are required when it is desired to produce fiber of the XXXX grade, which, as before stated, is known in the market as "black moss." After the moss has stood for a time necessary to produce the required grade the bales are unpacked and the material is washed and then ginned, and finally dried.

By the process described I obtain fifty to one hundred pounds more marketable material than was obtainable under the old process.

Having thus described my invention, I claim as new and desire to secure by Letters Patent—

1. The herein-described process of curing moss, which consists in forming the moss into bales, piling the bales closely together, keeping the bales saturated, and allowing them to stand for a number of days, substantially as described.

2. The herein-described process of curing moss, which consists in forming the moss into bales, keeping the material saturated with water or other liquid at this time, and in then piling the bales closely together, keeping the bales saturated, and allowing them to stand for a number of days, substantially as described.

3. The herein-described process of curing moss, which consists in forming the moss into tightly-compressed bales, keeping the material well saturated at this time, piling the bales closely together, keeping the bales saturated, and allowing them to stand for a number of days, and in then washing the material, ginning it, and allowing it to dry, substantially as described.

CHARLES F. LOTTMAN.

Witnesses:
THOS. CONGROVE,
H. W. LOTTMAN.